United States Patent [19]

Nield et al.

[11] Patent Number: 5,364,901
[45] Date of Patent: Nov. 15, 1994

[54] CURABLE COMPOSITION

[75] Inventors: Eric Nield, Beaconsfield; Peter D. Palasz, Taplow; Philip L. Taylor, Burnham; Peter K. H. Lam, Hounslow, all of England

[73] Assignee: Imperial Chemical Industries, PLC, London, England

[21] Appl. No.: 785,007

[22] Filed: Oct. 30, 1991

[30] Foreign Application Priority Data

Nov. 5, 1990 [GB] United Kingdom ............. 9023979.9

[51] Int. Cl.$^5$ ............................................. C08L 43/04
[52] U.S. Cl. .................................... 524/521; 524/506; 525/209
[58] Field of Search ................ 524/501, 506, 521; 525/209

[56] References Cited

U.S. PATENT DOCUMENTS 4,593,068  6/1986  Hirose et al. ...................... 524/506

FOREIGN PATENT DOCUMENTS

| 61-155474 | 7/1986 | Japan | C09D 3/82 |
| 62-169863 | 7/1987 | Japan | C09D 1/00 |
| 324017 | 12/1988 | Japan . | |
| 2169651 | 6/1990 | Japan . | |

*Primary Examiner*—Melvyn I. Marquis
*Assistant Examiner*—D. Aylward
*Attorney, Agent, or Firm*—Cushman, Darby & Cushman

[57] ABSTRACT

This invention is a silica free curable composition comprising
  A) A stable dispersion in an aqueous medium of a First Polymer having a weight average molecular weight of at least 50,000 which is insoluble in water and contains silane groups with hydrolyzable functionality.
  B) A solution or dispersion in the aqueous medium of a second polymer which has a number average molecular weight between 1,000 and 20,000 and at least two silane groups with hydrolyzable functionality. The non-volatile weight ratio of the first polymer to the second is 40:1 to 1:4.

9 Claims, No Drawings

CURABLE COMPOSITION

This invention relates to an aqueous curable composition, its preparation and use.

Aqueous curable coating compositions which comprise polymers having hydrolysable silane groups are known. These compositions can form crosslinked coatings on removal of the water, either by subsequent reaction between the hydrolysable silane groups or alternatively by reaction of the silane groups with hydroxyl groups.

European Patent Application No. EP-A-280994 discloses electrodepositable coating compositions which comprise a polymer having ionic groups and hydroxyl groups and a crosslinking agent having at least two alkoxy silane groups. The polymer and crosslinking agent are dissolved or dispersed together in water.

A problem with compositions which rely for curing on reaction between silane groups and hydroxyl groups is that the resulting Si—O—C bond is polar and is unstable to moisture which gives rise to poor water resistance in the cured coating.

European Patent Application No. EP-A-276469 discloses an electrodepositable coating composition which comprises an aqueous dispersion or solution of a polymer having both ionic groups and alkoxy or hydroxy silane groups.

Published British Patent Application GB-A-2 215 339 discloses aqueous dispersions of a vinyl polymer which has a low level of silane functionality. Similar compositions are disclosed in British Patent GB-B-1407872.

British Patent GB-A-1,407,827 discloses aqueous dispersions of a vinyl polymer which has hydrolysable silane groups by virtue of the inclusion of a silane functional monomer during the process of making the polymer.

A problem with the use of the polymers which are soluble in water and which contain hydrolysable silane groups is that these can only be made at relatively dilute solutions if they are to have a low viscosity. More concentrated solutions have an unacceptably high viscosity and are prone to premature crosslinking and gellation.

A problem with dispersions of polymers having silane groups is that only low levels of silane can be incorporated into the polymer. The incorporation of higher levels of silane leads to ongoing intra-molecular crosslinking between silane groups within the dispersed particles. This results in very highly internally crosslinked particles which are poor film-formers particularly at or near ambient temperature. The use of low levels of hydrolysable silane groups in the polymer leads to a low level of crosslinking in films formed from these compositions. This low level of crosslinking leads to poor film properties such as poor water resistance and poor solvent resistance.

We have now discovered an aqueous composition which comprises a high molecular weight silane functional polymer in dispersion in an aqueous medium and which also comprises a relatively low molecular weight silane functional polymer having anionic hydrophilic groups which is dispersed or dissolved in the aqueous medium. This composition can be made to form cured films having a surprisingly improved balance of properties. The improved balance of properties includes a combination of good film formation, drying time and stain and water resistance. The compositions are storage stable at high solids.

According to the present invention there is provided a silica free curable composition comprising:

A) a stable dispersion in an aqueous medium of a First Polymer having a weight average molecular weight of at least 50,000, which is insoluble in water and which contains silane groups of formula;

in which a is 0 to 2, $R^1$ is $C_{1-6}$ alkyl, and R is OH or a hydrolysable group, the groups of Formula (1) contributing from 0.05 to 2% by weight of silicon to the weight of the First Polymer, and B) a solution or dispersion in the aqueous medium of a Second Polymer, which is an addition polymer, a polyurea polymer or a polyurethane polymer, which has a number average molecular weight between 1000 and 20,000, and which contains at least two silane groups of formula (1), the groups of formula (1) contributing from 0.1 to 8% by weight of silicon to the weight of the Second Polymer, and also comprising covalently bonded acid groups which render it soluble or self-dispersible in the aqueous medium, the non-volatile weight ratio of the First Polymer to the Second Polymer in the composition being in the range 40:1 to 1:4.

Preferably the non-volatile weight ratio of the First Polymer to the Second Polymer in the composition is from 30:1 to 1:3, most preferably from 2:1 to 1:2.

The aqueous medium is one which predominantly comprises water. Preferably the aqueous medium is at least 60% by weight of water and more preferably at least 75% by weight. The balance of the aqueous medium can comprise water miscible organic solvents.

Examples of suitable water miscible organic solvents are glycol ethers such as propylene glycol monomethyl ether (available as Dowanol PM from Dow Chemicals), $C_{1-4}$ alkyl alcohols such as methanol, ethanol, propan-1-ol and butan-1-ol, and N-methyl pyrrolidone. These solvents can be added to improve film properties or can result from the processes of making one or both of components (A) or (B).

The number average molecular weight of both of the Polymers can be measured by gel permeation chromatography (g.p.c.).

In the case of the First Polymer the molecular weight measurement is carried out by shaking a small sample (for example 50 mg) of the aqueous dispersion of First Polymer with about 10 $cm^3$ of a strong solvent such as tetrahydrofuran. The Second Polymer is dissolved up in a strong solvent such as tetrahydrofuran. The g.p.c. measurement is made on the resulting solutions.

Usually there is also a proportion of the First Polymer which is insoluble in the solvent. This is often referred to as a 'gel fraction' and results from crosslinking within the dispersed particles of First Polymer. The gel fraction is usually between 5 and 80% by weight of the First Polymer. The gel fraction is of very high molecular weight and is ignored in determining the molecular weight of the First Polymer.

Preferably the First Polymer has a molecular weight, as measured by the above method, greater than 70,000.

Preferably the silane groups of Formula (1) contribute from 0.07 to 1.5% by weight of silicon to the weight of the First Polymer, more preferably from 0.1 to 1.2% by weight and most preferably from 0.1 to 0.6%.

The group R can be a hydrolysible group. A hydrolysable group is one which can be hydrolysed to give a hydroxyl group on the silicon atom in the presence of water. Examples of suitable hydrolysable groups are $C_{1-6}$ alkoxy, $C_{2-4}$ alkoxy—$C_{2-4}$ alkoxy, $C_{2-4}$ alkanoyl, alkyl carboxy, enolate and oxime. Preferably in the groups of formula (1) R is $C_{1-6}$ alkoxy particularly methoxy or ethoxy.

Preferably $R^1$ is methyl or ethyl.

Preferably the dispersion comprises particles of the First Polymer having a particle size in the range 50 to 500 nm, more preferably 90 to 250 nm and most preferably 90 to 200 nm.

Preferably the First Polymer is a polyurea, polyurethane or an addition polymer, more preferably an addition polymer.

Suitable addition polymers comprise structural units and functional units. The structural units are derived from vinyl or acrylic monomers which do not have reactive groups. Examples of vinyl monomers which do not have reactive groups are vinyl acetate, vinyl versatate and styrene. Examples of acrylic monomers which do not have reactive groups are C1–10 alkyl esters of acrylic or methacrylic acid such as methylmethacrylate, ethylmethacrylate, propylmethacrylate, pentylmethacrylate, hexylmethacrylate, ethylacrylate, propylacrylate, butylacrylate, pentylacrylate, hexylacrylate, octylacrylate and 2-ethylhexylacrylate.

Preferably the structural units are selected from C1–6 alkyl esters of acrylic or methacrylic acid and vinyl acetate, and most preferably are C1–4 alkyl esters of acrylic and methacrylic acids.

The structural units can also comprise a proportion of hydroxyl functional monomers, for example hydroxy $C_{2-6}$ alkyl acrylates or methacrylates. Suitable hydroxyl functional monomers are hydroxy ethyl acrylate, hydroxypropyl acrylate and hydroxyethyl methacrylate.

The structural units can also comprise a proportion of polyfunctional monomers which have two or more polymerisable double bonds. Examples of polyfunctional monomers are divinylbenzene, ethylene glycol dimethacrylate and pentaerithritol triacrylate. These polyfunctional monomers cause the polymer particles to be internally crosslinked.

Preferably the polymer comprises no more than 5% by weight of structural units derived from polyfunctional monomers, more preferably no more than 2% by weight and most preferably no more than 0.5% by weight.

The functional units are derived from functional monomers having silane groups of formula (1).

Examples of suitable functional monomers are 3(trimethoxysilyl) propyl methacrylate, 3(triethoxysilyl) propyl methacrylate, 3(dimethoxymethyl silyl) propyl methacrylate, 2-(3-Cyclohexenyl)ethyl triethoxysilane, 3-butenyltriethyoxysilane and vinyl trialkoxy silanes such as vinyl trimethoxy silane and vinyl triethoxy silane. These monomers can also be used in a partially or fully hydrolysed form.

The First Polymer is held in stable dispersion by the presence of a stabiliser. The stabiliser comprises a hydrophilic component covalently bonded to an anchor component.

The hydrophilic component can be ionic or non-ionic. Preferably it is non-ionic. A non-ionic hydrophilic component comprises a polymer which is water-soluble.

Examples of suitable non-ionic hydrophilic components are poly(vinyl pyrrolidones) of molecular weight 1000 to 10000, and poly(ethylene oxide) of molecular weight 300 to 10000.

Preferably the hydrophilic component is a poly(ethylene oxide) polymer of molecular weight 300 to 10000 more preferably 400 to 5000 and most preferably 400 to 2500. It is thought that the presence of a poly(ethylene oxide) polymer moiety in the composition tends to inhibit reaction between the silane groups in the composition and so increases the stability of the composition to premature crosslinking and gellation.

The anchor component can be associated with the First Polymer or can be covalently bonded to the First Polymer.

Suitable anchor components which can be associated with the First Polymer include alkyl and alkyl-aryl groups. Preferably the anchor component has at least 6 carbon atoms and more preferably at least 10 carbon atoms. Examples of suitable alkyl groups are $C_{8-20}$ alkyl such as octyl, nonyl dodecyl and lauryl. Examples of suitable alkyl-aryl groups are $C_{8-20}$ alkyl phenyl and $C_{8-20}$ alkyl naphthenyl such as octyl phenyl, nonyl phenyl, dodecyl phenyl, lauryl phenyl and nonyl naphthyl groups. Examples of stabilisers having an anchor component which associates with the first polymer are nonyl phenol ethers of poly(ethylene oxides) of molecular weight 300 to 10000, preferably 400 to 2500. One such stabiliser is commercially available as Levelan P208 from Lankro Chemicals.

Preferably the anchor component is covalently bonded to the First Polymer. It has been found that covalently bonded stabilisers give rise to greater colloidal stability in the First Polymer. This is particularly noticable in the presence of small quantities of organic solvent. This improvement in colloidal stability can be important because the Second Polymer often carries with it some organic solvent from its manufacture. Organic solvents may also be added to the composition to improve the flow-out of applied films.

Suitable anchor components which can be covalently bonded to the First Polymer, when the First Polymer is an addition polymer, are units derived from unsaturated groups such as acrylate, methacrylate, allyl or vinyl groups. These units can be incorporated into the First Polymer during its manufacture by including an acrylate, methacrylate allyl or vinyl functional stabiliser precursor into the reaction mixture.

A stabiliser precursor comprises the hydrophilic component covalently bonded to an unsaturated group which can be polymerised into the monomer mixture when the First Polymer is formed. Examples of suitable stabiliser precursors are poly(ethylene glycol) methacrylate, and the stabilisers derived from triallyl pentaerithritol disclosed in U.S. Pat. No. 4,413,073, the disclosure of which is herein incorporated by reference.

Preferably the stabiliser is present in an amount from 2 to 12% by weight based on the weight of the First Polymer.

For the purposes of calculating the weight of the First Polymer, the stabiliser is considered to be part of the First Polymer.

A proportion of conventional ionic surfactant can be included in addition to the non-ionic stabiliser. Examples of conventional ionic surfactants are alkyl sulphates and sulphonates and alkyl aryl sulphonates.

Preferably any ionic surfactant is present in an amount of less than 2% by weight based on the weight of the First Polymer, more preferably less than 1% by weight.

Preferably when the First Polymer is an addition polymer it has a glass transition temperature, calculated on the basis of the Fox equation, of from $-10°$ to $50°$ C., more preferably from $0°$ to $40°$ C., and most preferably from $10°$ to $40°$ C.

Examples of suitable polyurethane dispersions are disclosed in U.S. Pat. No. 3,983,291 and in European Patent Applications EP-A-0 163 214 and EP-A-0 315 006.

The Second Polymer is soluble or self dispersible in the aqueous medium. By soluble is meant that a test mixture of 2 ml of the aqueous medium and 50 mg of the Second Polymer gives no particle size reading on a Malvern Zetasizer particle size analyser (available from Malvern Instruments, England). By self-dispersible is meant that the second polymer will form a stable dispersion in the aqueous medium when neutralised without the need for further surface active agents. Preferably the Second Polymer is soluble in the aqueous medium.

Preferably the Second Polymer has a number average molecular weight of between 1000 and 15,000, more preferably between 2000 and 10000.

Preferably the groups of Formula (1) contribute between 0.5 and 8% by weight of silicon to the weight of the Second Polymer, and more preferably between 0.5 and 2.5% by weight.

Examples of suitable acid group are sulphonic acid groups and carboxylic acid groups. Preferably the acid groups are carboxylic acid groups.

When the acid group is a carboxylic acid group then the Second Polymer preferably comprises from 2 to 9% by weight of carboxylic acid groups.

The Second Polymer can also comprise non-ionic hydrophilic groups. Examples of suitable non-ionic groups are pyrrolidone groups, hydroxyl groups and poly(ethylene oxide) moieties of molecular weight 200 to 2000, preferably 500 to 2500.

When the hydrophilic groups comprise carboxyl groups together with non-ionic groups then the Second Polymer preferably comprises 2 to 20% by weight of non-ionic groups, preferably 3 to 15% by weight.

The Second Polymer comprises structural units, functional units, acid group-containing units and optionally, non-ionic hydrophilic units.

When the Second Polymer is an addition polymer the structural units are derived from vinyl or acrylic monomers which do not have reactive groups. Examples of vinyl monomers which do not have reactive groups are vinyl acetate, vinyl versatate and styrene. Examples of acrylic monomers which do not have reactive groups are C1-10 alkyl esters of acrylic or methacrylic acid such as methyl methacrylate, ethyl methacrylate, propyl methacrylate, pentyl methacrylate, hexyl methacrylate, ethylacrylate, propylacrylate, butylacrylate, pentylacrylate, hexylacrylate, octylacrylate and 2-ethylhexylacrylate.

Preferably the structural units are selected from C1-6 alkyl esters of acrylic or methacrylic acid and vinyl acetate, and most preferably are C1-4 alkyl esters of acrylic and methacrylic acids.

When the Second Polymer is an addition polymer the functional units are derived from functional monomers having groups of formula (1).

Examples of suitable functional monomers are 3(trimethoxysily) propyl methacrylate, 3(triethoxysilyl)propyl methacrylate, gamma-methacrylyl propyl trimethoxy silane 2-(3-Cyclohexenyl) ethyltriethoxysilane, 3-butenyltriethyoxysilane and vinyl trialkoxy silanes such as vinyl trimethoxy silane and vinyl triethoxy silane. These monomers can also be used in a partially or fully hydrolysed form.

Examples of compounds containing a poly(ethylene oxide) moiety are alkyl, aryl and alkyl-aryl ethers of poly(ethylene oxide). Many alkyl, aryl and alkyl-aryl ethers of poly(ethylene oxide) are available as non-ionic stabilisers or surfactants.

Preferred compounds containing a poly(ethylene oxide) moiety are non ionic stabilisers or surfactants. Preferably these have an HLB value (Hydrophilic-lypophilic balance) of between 10 and 20, more preferably between 10.5 and 19.5. HLB values for many of these compounds are given in a standard reference work, "McCutcheons emulsifiers and detergents" North American Edition, 1986.

One particularly suitable compound is a nonyl phenyl ether of poly(ethylene oxide) commercially available as Levelan P208 from Lankro Chemicals. Levelan P208 has an HLB value of about 16.

When the First Polymer is an addition polymer, the aqueous dispersion of the First Polymer can be made in a known manner by emulsion or dispersion polymerisation.

Preferably the First Polymer is made by emulsion polymerisation in the aqueous medium. The preferred emulsion polymerisation is carried out by a process in which the monomers are slowly fed into the aqueous medium together with a surfactant and a polymerisation initiator such as a mixture of hydrogen peroxide and ascorbic acid or a mixture of ammonium persulphate and sodium metabisulphite. The reaction mixture is stirred during the addition of the initiator and monomers so as to form an emulsion. The temperature of the reaction mixture is maintained at a temperature sufficiently high so as to cause polymerisation of the monomers, for example between $30°$ and $100°$ C.

In a particularly preferred process the polymerisation is preceded by a short prepolymerisation in which one or more of the monomers from which the structural units are derived are polymerised in the absence of monomers from which the functional units are derived. The prepolymerisation produces polymer seeds onto which the particles of polymer dispersion form during the subsequent polymerisation.

When the First Polymer is a polyurethane polymer it can be mde by the processes described in U.S. Pat. No. 3,983,291 and in European Patent Applications EP-A-0 163 214 and EP-A-0 315 006.

The Second Polymer can be made by conventional methods such as solution polymerisation.

When the Second Polymer is an addition polymer it can be made by solution polymerisation in which a monomer mixture together with a polymerisation initiator are slowly added to a suitable solvent which is held at a suitable reaction temperature.

Suitable solvents include xylene, toluene and dipropylene glycol monomethylether. When a solvent which is not miscible with water is used, such as when the Second Polymer is an addition polymer the acid group-containing units are derived from monomers which have anhydride groups or, preferably, acid groups. An example of a monomer having an anhydride group is succinic anhydride. Examples of monomers having acid groups are acrylic and methacrylic acid.

When the Second Polymer is an addition polymer and also comprises non-ionic hydrophilic units then these units are derived from monomers having a non-ionic hydrophilic group. Particular examples of monomers having a non-ionic hydrophilic group are poly(ethyleneglycol) methacrylate of molecular weight 2,000, hydroxyethylmethacrylate and hydroxyethylacrylate.

When the Second Polymer is a polyurethane polymer or a polyurea polymer the functional units are derived from compounds having silane groups of Formula (1) and one or more groups which can react with isocyanate groups.

Examples of groups which can react with isocyanate groups are hydroxyl groups and primary or secondary amine groups. Preferably the functional units are derived from a compound having one or more amine groups.

Examples of compounds having silane groups are N-methylpropyl trimethoxysilane and N-aminoethyl aminopropyl trimethoxysilane.

When the Second Polymer is a polyurethane polymer the structural units are derived from two types of compound, one of which is a polyamine or polyol and the other of which is a polyisocyanate.

Polyols or poly amines are compounds having two or more hydroxyl groups or amine groups. Many different polyols and polyamines are well known and are commercially available.

Polyols can be simple polyols or polymeric polyols. Examples of simple polyols are trimethylol propane and pentaerithritol. Examples of polymeric polyols are polyester polyols and polyether polyols. One suitable polyester polyol is available as Oxyflex (Trademark) S-1015-120 from the Occidental Chemical Company.

Polyamines can be simple polyamines such as ethylene diamine, or can be polymeric polyamines such as polyester polyamines or polyether polyamines.

It will be understood by those skilled in the art that the use of polyols will lead to predominantly polyurethane polymers and the use of polyamines will lead to predominantly polyurea polymers. Mixtures of polyols and polyamines can be used to make mixed polyurethane/polyurea polymers.

Polyisocyanates are compounds having two or more isocyanate groups. Many polyisocyanates are well known and are commercially available. Examples of suitable diisocyanates are aromatic diisocyanates such as toluene diisocyanate and aliphatic diisocyanates such as hexamethylene diisocyanate and isophorone diisocyanate. Examples of polyisocyanates with more than two isocyanate groups are the isocyanurates of the above mentioned diisocyanates and the reaction products of diisocyanates with polyols such as trimethylol propane or pentaerithritol.

Preferably both the polyol or polyamine and the isocyanate from which the structural units are derived are predominantly difunctional. This means that the resulting Second polymer has few branches and reduces the chance of gelling during manufacture.

When the Second Polymer is a polyurethane polymer or polyurea polymer the acid group-containing units are derived from compounds having an acid group and one or more groups which can react with the isocyanate groups or the hydroxyl groups on the compounds from which the structural units are derived.

Examples of groups which can react with isocyanate groups are amine groups and hydroxyl groups. An example of a group which can react with hydroxyl groups is an isocyanate group.

Preferably the compound from which the acid group-containing units are derived has two groups which can react with the compounds from which the structural units are derived.

Preferably the compound has hydroxyl groups.

An example of a suitable compound is dimethylol propionic acid.

The optional non-ionic hydrophilic units are derived from compounds having a non-ionic hydrophilic component and one or more groups which can react with the isocyanate groups or the hydroxyl or amine groups on the compounds from which the structural units are derived.

Examples of non-ionic hydrophilic groups are poly (ethylene oxide) polymers of molecular weight 200 to 2500.

Examples of groups which can react with isocyanate groups are amine groups and hydroxyl groups. An example of a group which can react with hydroxyl groups is an isocyanate group.

Preferably the compound from which the non-ionic hydrophilic group-containing units are derived has two groups which can react with the compounds from which the structural units are derived.

Examples of suitable compounds are disclosed in European Patent Application EP-A 0 317 258.

The composition of the present invention can be made by mixing the Second polymer an aqueous dispersion of the First Polymer.

According to the present invention there is provided a method of making a composition as hereinbefore described which comprises mixing a Second Polymer as hereinbefore described with an aqueous dispersion of a First Polymer as hereinbefore described.

Preferably an aqueous solution of the Second Polymer is first formed and the solution is then mixed with the dispersion of First Polymer. The aqueous solution of Second Polymer can be made in an aqueous medium as defined above.

In order for the Second Polymer to dissolve or disperse in an aqueous medium, the acid groups on the Second Polymer must be at least partially neutralised. The acid groups can be neutralised by the addition of a suitable base such as sodium hydroxide or aqueous ammonia. Preferably the acid groups are neutralised with ammonia as this is volatile and disappears from the composition when it is dried. Usually the anionic groups are neutralised to a pH of between 7 and 10.

The base is preferably added to the Second Polymer before forming the aqueous solution of dispersion of the Second Polymer.

Optionally, a compound containing a poly(ethylene oxide) moiety can be added to the mixture of the Second Polymer and the aqueous medium. The presence of a poly(ethylene oxide) moiety surprisingly appears to stabilise the hydrolysable silane groups on the Second Polymer against premature crosslinking and gellation. The stabilising effect is particularly noticeable in solutions of high solids content, which have a higher concentration of hydrolysible silane group and which are thus particularly prone to gellation. The presence of a poly(ethylene oxide) moiety is also particularly useful if the solution of Second Polymer is to be left standing for some time before being mixed with the dispersion of First Polymer. The stabilising effect of the poly(ethylene oxide) moiety is also carried over into the compositions of the invention. Thus the presence of a poly(ethylene oxide) moiety is also particularly useful where the non-ionic stabiliser for the First Polymer does not itself contain a poly(ethylene oxide) moiety.

An aqueous solution or dispersion of Second Polymer which also comprises a compound containing a poly(ethylene oxide) moiety is novel when the Second Polymer is an addition polymer.

According to the present invention there is also provided an aqueous solution or dispersion of a Second Polymer which is an addition polymer as herein defined which also comprises from 1 to 10% by weight of the Second Polymer of a compound containing a poly(ethylene glycol) moiety.

Preferably the solution or dispersion of Second Polymer is a solution.

Preferably the solution or dispersion comprises from 2 to 6% by weight of the compound containing a poly(ethylene oxide) moiety.

Preferably the solution or dispersion comprises at least 0.2% by weight of the Second Polymer, more preferably at least 10% by weight and most preferably at least 15% by weight.

Preferably the polyethylene oxide moiety has a molecular weight between 200 and 5000, and more preferably between 350 and 2500. toluene or xylene, then the solvent must be removed before the Second Polymer can be dissolved or dispersed in water. Preferably a water miscible solvent such as dipropylene glycol monomethylether is used because then the resulting polymer solution can be dissolved or dispersed in water without removing the solvent.

Suitable polymerisation initiators include azobisdiisobutyronitrile, tertiary butyl peroxy-2-ethyl hexanoate, a mixture of tertiary butyl hydroperoxide, sodium metabisulphite and ammonium persulphate, or a mixture of hydrogen peroxide and ascorbic acid.

When the Second Polymer is a Polyurethane polymer or a polyurea polymer it can be made in solution, for example by adding the polyisocyanate to a solution of the other components in a suitable non-reactive solvent such as xylene, if neccessary with heating.

The composition can also comprise other conventional coating components such as pigments, fillers, thickeners, biocides and UV stabilisers.

The compositions of the invention can be used to form cured coating films.

According to the present invention there is provided a process for forming a cured coating on a substrate which comprises the steps of;
(a) applying a layer of a curable composition as herein described to the surface of a substrate, and,
(b) allowing the layer to cure.

The curable composition can be applied to the surface of a substrate by conventional means such as brushing roller-coating or spraying.

Suitable substrates include wood, steel, aluminium and glass. The layer can also be applied over a suitable basecoat or undercoat.

The layer can be cured either by allowing the aqueous phase to evaporate at room temperature or by heating for example to 70°–90° C. for 10 minutes.

The invention will now be further illustrated by means of the following examples:

EXAMPLES

1. PREPARATION OF AQUEOUS DISPERSIONS OF THE FIRST POLYMER

1.1 Preparation of Aqueous Dispersion 1 to 5

|    |                                        | Weight (g)   |
|----|----------------------------------------|--------------|
| A: | Water                                  | 530.00       |
|    | "Levelan" P208                         | 8.5          |
|    | Sodium bicarbonate                     | 2.03         |
| B: | Methyl methacrylate                    | See Table 1  |
|    | Butyl acrylate                         | See Table 1  |
| C: | Water                                  | 6.75         |
|    | t-butyl hydroperoxide                  | 0.24         |
| D: | Water                                  | 12.00        |
|    | Sodium Metabisulphite                  | 0.48         |
| E: | Water                                  | 6.00         |
|    | Sodium Metabisulphite                  | 0.24         |
| F: | Water                                  | 6.80         |
|    | Ammonium persulphate                   | 1.35         |
| G: | Methyl methacrylate                    | See Table 1  |
|    | Butyl acrylate                         | See Table 1  |
|    | "Levelan" 208                          | 9.70         |
|    | Stabiliser Precursor                   | 31.90        |
|    | 3(trimethylsilyl)propyl Methacrylate   | See Table 1  |
| H: | Water                                  | 38.25        |
|    | Sodium Metabisulphite                  | 1.53         |
| I: | Water                                  | 5.40         |
|    | Ammonium persulphate                   | 0.69         |
| J: | Water                                  | 19.00        |
|    | Sodium Metabisulphite                  | 0.76         |
| K: | Water                                  | 7.02         |
|    | Metacide 300 (commercial antifungal agent) | 1.76     |

Preparation of Aqueous Dispersion 6

For the preparation of Aqueous dispersion 6 the same components were used as for Aqueous Dispersions 1 to 5 except for components G, A, and H which were as follows;

|    |                               |             |
|----|-------------------------------|-------------|
| A: | Water                         | 530.00      |
|    | Sodium lauryl sulphate        | 8.50        |
|    | Sodium bicarbonate            | 2.03        |
| H: | Water                         | 120.00      |
|    | Sodium metabisulphite         | 1.53        |
|    | Sodium lauryl sulphate        | 29.30       |
| G: | Methyl methacrylate           | See Table 1 |
|    | Butyl acrylate                | See Table 1 |
|    | 3(trimethyl silyl) propyl methacrylate | See Table 1 |

In the above lists the following abbreviations are used;

Levelan P208 is an 80% solution in water of a nonyl phenol ether of a poly(ethylene oxide) available from Lankro Chemicals.

Stabiliser Precursor was the reaction product of pentaerythritol triallyl ether, butylene oxide and ethylene oxide reacted in the molar ratio 1:2:35 as described in EP-B-0 094 386.

The amounts of methyl methacrylate, butyl acrylate, and 3(trimethoxysilyl)propyl methacrylate are given in Table 1.

TABLE 1

|            | B       |        | G       |        |                  |
|------------|---------|--------|---------|--------|------------------|
| Dispersion | MMA (g) | BA (g) | MMA (g) | BA (g) | Silane Monomer (g) |
| 1          | 33.4    | 26.0   | 300.6   | 234.1  | 31.3             |
| 2          | 33.8    | 27.5   | 304.4   | 244.4  | 15.6             |
| 3          | 34.5    | 27.5   | 309.6   | 247.6  | 6.2              |
| 4          | 37.5    | 23.1   | 339.7   | 210.2  | 15.6             |

TABLE 1-continued

| | B | | G | | |
|---|---|---|---|---|---|
| Dispersion | MMA (g) | BA (g) | MMA (g) | BA (g) | Silane Monomer (g) |
| 5 | 44.2 | 16.2 | 402.4 | 147.5 | 15.6 |
| 6 | 33.8 | 27.5 | 304.4 | 244.4 | 15.6 |

The following abbreviations are used in Table 1;
Silane monomer 3(trimethoxysilyl)propyl methacrylate.
MMA is methyl methacrylate.
BA is butyl acrylate.

Method of Preparation (A) was charged into a 2 liter flask fitted with a reflux condenser, a thermometer and a stirrer. The mixture was warmed to 50° C. and charge (B) was added. The contents were stirred for 10 minutes to emulsify the acrylic monomers. Charge (C) was added, followed by 10 min stirring. (D) was then added and the temperature was raised to 60° C. (E) was added, followed by 20 minutes' stirring, during which time a prepolymer seed was formed consisting of particles of number average diameter 75 nm.

Charge (F) was added, followed immediately by he dropwise and concurrent addition of (G) and (H) over a period of 150 minutes. Stirring was continued for a further 10 minutes and charge (I) was added in one portion followed immediately by (J), dropwise over 30 minutes. The mixture was stirred for 20 minutes and cooled to below 30° C. when (K) was added, followed by 10 minutes' stirring.

The resulting mixture was filtered, giving a stable colloidal dispersion of pH 6.4, 50% solids, a silicon content of 0.282% by weight, a Tg of 10° C. as calculated by the Fox equation and a number average diameter as measured on a Malvern Zetasizer (available from Malvern Instruments, England) of 170 nm.

1.2 Summary of First Polymers 1 to 6

The percentage by weight of silicon in each of the First Polymers 1 to 6 (% Si) together with their Tg as calculated by the Fox equation (Tg) is given in Table 3.

TABLE 3

| Dispersion | % Si | Tg |
|---|---|---|
| 1 | 0.56 | 10 |
| 2 | 0.28 | 10 |
| 3 | 0.11 | 10 |
| 4 | 0.28 | 20 |
| 5 | 0.28 | 40 |
| 6 | 0.28 | 10 |

2. PREPARATION OF SECOND POLYMER

2.1 Preparation of Second Polymers 1 to 6

Second Polymers 1 to 6 are acrylic polymers made using an acid functional monomer and a silane functional monomer.

The quantities of monomers used are given in Table 4. The following general method was used to make Second polymers 1 to 6;

A 3 liter resin flask fitted with a stirrer, a thermometer, a reflux condenser, a nitrogen inlet and a heating mantle was charged with (A) in Table 4, and heated to 110° C. with stirring and nitrogen bubbling through at the rate of 1 ml per second. (B) was added dropwise over 3 hours via a mechanical pump. The temperature of the mixture was maintained at 105°–110° C. throughout the duration of the feed. The mixture was further stirred for 15 minutes. (C) was added in 6 portions over 1 hour. The mixture was stirred for a further 15 minutes before it was allowed to cool to room temperature.

TABLE 4

| | A | B | | | | | | | C |
|---|---|---|---|---|---|---|---|---|---|
| Second Polymer | MHP (g) | MMA (g) | BA (g) | AA (g) | Silane Monomer (g) | Peg MA (g) | HEA (g) | BPEH (g) | BPEH (g) |
| 1 | 667 | 432 | 482 | 36 | 50 | — | — | 50 | 10 |
| 2 | 667 | 432 | 442 | 36 | 50 | 40 | — | 50 | 10 |
| 3 | 667 | 432 | 382 | 36 | 50 | — | 100 | 50 | 10 |
| 4 | 667 | 419 | 445 | 36 | 100 | — | — | 50 | 10 |
| 5 | 667 | 393 | 371 | 36 | 200 | — | — | 50 | 10 |
| | MHP | MMA | EHA | AA | Silane Monomer | HPMA | | BPEH | BPEH |
| 6 | 667 | 391 | 282 | 36 | 50 | 241 | — | 37.5 | 10 |

The following abbreviations are used in Table 4:
MHP is 1-methoxy-2-hydroxypropane
MMA is methylmethacrylate
BA is butylacrylate
AA is acrylic acid
EHA is 2-ethyl hexyl acrylate
HPMA is hydroxy propyl methacrylate
Silane Monomer 3(trimethoxysilyl)propyl methacrylate.
Peg MA is methoxy polyethylene glycol 2000 methacrylate
HEA is 2-hydroxyethyl acrylate
BPEH is tertiary butyl peroxy-2-ethyl hexanoate

2.2 Properties of Second Polymers 1 to 6

The percentage by weight of silicon (% Si) and the weight average molecular weight (MWt) of each of Second Polymers 1 to 6 is given in Table 5.

TABLE 5

| Second Polymer | % Si |
|---|---|
| 1 | 0.57 |
| 2 | 0.57 |
| 3 | 0.57 |
| 4 | 1.13 |
| 5 | 2.26 |
| 6 | 0.57 |

2.3. Neutralisation of Second Polymers 1 to 6

To a sample of Second Polymers 1 to 6 at room temperature was added sufficient ammonium hydroxide solution to fully neutralise the acid functionalities. This was followed by 6% (by weight of non-volatile content)

of a surfactant and dilution with demineralised water to a total non-volatile content of 31%.

Second Polymers 2 and 3 are partially solubilised by Peg MA and HEA respectively. Neutralisation to an equivalent acid value of 5 to 28 mg.KOH/g gave a range of maximum stable non-volatile content in solution from 25 to 40%.

2.4 Preparation of Second Polymer 7

Second Polymer 7 was a polyurethane polymer having carboxylic acid groups and non-ionic hydrophilic groups.

An adduct was prepared of 2-hydroxyethyl acrylate and a polyoxyalkyleneamine. This was prepared by adding 2-hydroxyethyl acrylate (23.2 g, 0.2 mol) in one portion to a stirred solution of Jeffamine M-1000 (trademark; a polyoxyalkylene amine from Texaco Chemicals; 200 g, 0.2 mol) in toluene (400 ml) at 70° C. After 24 hours, the solvent was removed in vacuo at 50° C. to give a colourless waxy solid.

A mixture of the above adduct (108 g), N-methyl pyrrolidone (77 g), dimethyl propionic acid (27 g) and Oxyflex S-1015-120 (Trademark; A polyester diol from Occidental Chemicals; 393.75 g) was heated to 80° C. until a solution formed. Desmodure W (trademark; an aliphatic diisocyanate from Bayer; 371.51 g) was added to this solution followed by tin octoate (0.09 g). The mixture was heated to 90° C. for 1 hour, further tin octoate (0.09 g) was added and the mixture was held at 90° C. for 2 hours. The isocyanate value of the resulting mixture was 5.86% by weight of NCO.

A mixture of N-methyl propyl trimethoxysilane (46.6 g) and N-aminoethyl) aminopropyl trimethoxysilane (24.3 g) was added to the product from above (300 g) over 12 minutes at 86 C. Dowanol PM (Trademark; a propylene glycol monomethyl ether from Dow Chemicals; 125 g and the mixture held at 86 C. for 1 hour. After 24 hours at room temperature no isocyanate groups could be detected using infra red spectrometry. The product was diluted with Dowanol PM to 60% non-volatile solids. The number average molecular weight of the product was 3500 as measured by GPC.

Aqueous ammonia (0.24 g of a 30% by weight solution in water) was added to the above product (10 g) followed by water (19.5 g) to give an aqueous solution of 20% non-volatile content.

3. COMPOSITIONS AND TESTING

Various blends of Aqueous Dispersions 1 to 6 and Second Polymers 1 to 7 were made, and tested as follows.

3.1 Testing

The Compositions were evaluated for their performance as coatings by applying a layer of the Composition to a suitable substrate, allowing the Composition to dry and subsequently subjecting the dry film to physical testing as follows;

a) Touch dry time measurement

The time taken for a freshly applied coating to become dry to touch is measured by a sand deposition procedure.

A coating of 100 μm wet thickness is applied at ambient conditions to a horizontal glass panel. Under the same conditions the measurement procedure is carried out.

A hopper having a small outlet in its base is filled with dry sand which then trickles through the outlet. The hopper is caused to traverse the coating at a speed of 25.4 mm per hour with sand trickling onto the coating which is still wet but as time passes, the coating dries and there comes a point when the sand ceases to stick to it. The time taken to reach this point is regarded as the touch dry time, which is determined from the length of the trail of stuck sand.

b) Water spot resistance test

The resistance of a freshly applied coating to disfiguration by water is assessed.

A coating of 100 μm wet thickness is applied to a dry coat of a conventional alkyd paint that had been allowed to dry at 20° C. and 50% relative humidity for at least 7 days. The coating is allowed to dry for 24 hours at 20° C. and 50% relative humidity. Then a 1 ml drop of tap water is deposited, which is covered by a watch glass and allowed to stand at 20° C. for two hours. Then the glass is removed and the sample is immediately wiped dry and examined for disfiguration.

3.2 Compositions 1 to 5

Comparative Composition 1 comprised Second Polymer 1 alone. Compositions 2 to 4 comprised blends of Second Polymer 1 and Aqueous Dispersion 2 in various non-volatile ratios. Comparative Composition 5 comprised Aqueous Dispersion 2 alone. The compositions are summarised in Table 5.

TABLE 5

| Composition | Non-volatile ratio of Aqueous Dispersion 2:Second Polymer 1 |
|---|---|
| 1 (Comparative) | 0:20 |
| 2 | 5:15 |
| 3 | 10:10 |
| 4 | 15:5 |
| 5 (Comparative) | 20:0 |

Test results for Compositions 1 to 5

The test results for compositions 1 to 5 are given in Table 6.

TABLE 6

| Composition | Touch Dry | Water Spot |
|---|---|---|
| 1 (Comparative) | 9.5 | Acceptable |
| 2 | 9.5 | Good |
| 3 | 0.5 | Very Good |
| 4 | 0.5 | Very Good |
| 5 (Comparative) | Does not form film | |

3.3 Compositions 6 to 8

Compositions 6 to 8 were blends of Second Polymer 1 and various Aqueous Dispersions of First Polymer having different Tg (as calculated by the Fox equation) in a non-volatile ratio of 1:1. The compositions are summarised in Table 7.

TABLE 7

| Composition | Aqueous Dispersion | Tg | Second Polymer |
|---|---|---|---|
| 6 | 2 | 10 | 1 |
| 7 | 4 | 20 | 1 |
| 8 | 5 | 40 | 1 |

Test results for Compositions 6 to 8

Test results for compositions 6 to 8 are given in Table 8.

TABLE 8

| Composition | Touch Dry | Water Spot |
|---|---|---|
| 6 | 0.75 | Good |

TABLE 8-continued

| Composition | Touch Dry | Water Spot |
|---|---|---|
| 7 | 0.75 | Good |
| 8 | 0.75 | Good |

3.4 Compositions 9 to 11

Compositions 9 to 11 comprise a mixture of Second Polymer 1 and various First Polymers in a 1:1 non-volatile weight ratio. The compositions show the usefulness of a range of silane levels in the First Polymer. The compositions are summarised in Table 9, which also indicates the percentage by weight of silicon (% Si) found in the First Polymers.

TABLE 9

| Composition | First Polymer | % Si | Second Polymer |
|---|---|---|---|
| 9 | 1 | 0.53 | 1 |
| 10 | 2 | 0.28 | 1 |
| 11 | 3 | 0.11 | 1 |

Test Results for Compositions 9 to 11

The test results for Compositions 9 to 11 are given in Table 10.

TABLE 10

| Composition | Touch Dry | Water Spot |
|---|---|---|
| 9 | 0.5 | very good |
| 10 | 0.8 | very good |
| 11 | 0.8 | very good |

3.5 Compositions 12 to 14

Compositions 12 to 14 comprise a mixture of First Polymer 2 with various Second Polymers in a 1:1 non-volatile weight ratio. All of these compositions had a non-volatile content of 35%. The compositions are summarised in Table 11.

TABLE 11

| Composition | First Polymer | Second Polymer | % Si |
|---|---|---|---|
| 12 | 2 | 5 | 2.26 |
| 13 | 2 | 4 | 1.13 |
| 14 | 2 | 1 | 0.57 |

Test Results for Compositions 12 to 14

The results of testing Compositions 12 to 14 are given in Table 12.

TABLE 12

| Composition | Touch Dry | Water Spot |
|---|---|---|
| 12 | 0.5 | Very Good |
| 13 | 1.0 | Very Good |
| 14 | 1.5 | Very Good |

3.6. Compositions 15 and 16

Composition comprised Aqueous Dispersion 2 and Second Polymer 6 in a 1:1 ratio by non volatile weight. Composition 16 was comparative and comprised a 20% non-volatile solution of Second polymer 6 alone.

Test Results for Compositions 15 and 16

| Composition | Touch Dry | Water Spot |
|---|---|---|
| 15 | 0.75 | Very Good |
| 16 | 0.75 | Acceptable |

4. THE STABILITY OF SOLUTIONS OF SECOND POLYMER

In order to demonstrate the effect of a compound containing a poly(ethylene oxide) moiety on the storage stability of aqueous solutions of Second Polymer, various solutions of Second Polymer 1 were made up in water with the same non-volatile content of 35% but with varying levels of Levelan P208. Levelan P208 is a nonyl phenol ether of poly(ethylene oxide) from Lankro Chemicals. The solutions were visually inspected after 24 hours. The results are summarised in Table 13.

TABLE 13

| Solution | % Levelan | Appearance After 24 h. |
|---|---|---|
| 1 | 0.0 | white precipitate/gel |
| 2 | 2.0 | White precipitate/gel |
| 3 | 6.0 | Hazy |
| 4 | 10.0 | Clear-No change |
| 5 | 15.0 | Clear-No change |

To show that the effect of Levelan is more pronounced when the aqueous solution of Second Polymer is of high solids content, a series of aqueous solutions of Second polymer 1 were made having different non-volatile content. To a sample of each solution was added Levelan P208 at a level of 6% by weight based on the weight of the Second Polymer. A portion of each solution was left which did not contain Levelan. The solutions were stored at room temperature (20 C.) for 24 hours and then their appearance was assessed by eye. The solutions and the results are summarised in Table 14.

TABLE 14

| Solution | % Levelan | % Solids | Appearance After 24 h. |
|---|---|---|---|
| 6 | 0 | 31 | Gelled |
| 7 | 6 | 31 | No change |
| 8 | 0 | 28 | Gelled |
| 9 | 6 | 28 | No change |
| 10 | 0 | 23 | Hazy |
| 11 | 6 | 23 | No change |
| 12 | 0 | 7 | No change |
| 13 | 6 | 7 | No change |

5. STABILITY TESTS ON AQUEOUS DISPERSIONS

To test the stability of the aqueous dispersions of First Polymer to added organic solvent 1 Part by weight of 1-methoxy-2-hydroxypropane was added to 9 parts of two of these dispersions, The results are given in Table 15.

TABLE 15

| Aqueous Dispersion | Observation |
|---|---|
| 2 | Slight Precipitation |
| 6 | Flocculation |

6. STABILITY OF THE COMPOSITIONS

In order to test the stability of the compositions of the invention, compositions comprising 6 parts by weight of Second Polymer 6 were mixed with 4 parts of Aqueous Dispersion 2 and Aqueous Dispersion 6 in separate experiments. The compositions were allowed to stand for 24 hours at ambient temperature and their stability was observed. The results are given in Table 16.

TABLE 16

| Aqueous Dispersion | Observation |
|---|---|
| 2 | No change |
| 6 | Some precipitation |

We claim:

1. An aqueous silica free curable coating composition comprising:
   A) a stable dispersion in an aqueous medium of a First Polymer, which is an addition polymer, a polyurea polymer or a polyurethane polymer, having a weight average molecular weight of at least 50,000, which is insoluble in water and which contains silane groups of the formula:

in which a is 0 to 2, $R^1$ is $C_{1-6}$ alkyl, and R is OH or a hydrolysable group, the groups of Formula (1) contributing from 0.05 to 2% by weight of silicon to the weight of the First Polymer, said First Polymer being held in stable dispersion in said aqueous medium by a non-ionic surfactant which enhances the stability of said First Polymer; and
   B) a solution or dispersion in the aqueous medium of a Second Polymer, which is an addition polymer, a polyurea polymer or a polyurethane polymer which has a number average molecular weight between 1,000 and 20,000, and which contains at least two silane groups of formula (1), the groups of formula (1) contributing between 0.1 and 8% by weight of silicon to the weight of the Second Polymer, and also comprising covalently bonded acid groups which render it soluble or self-dispersible in the aqueous medium,
   the non-volatile weight ratio of the First Polymer to the Second Polymer in the composition being in the range 40:1 to 1:4.

2. A composition according to claim 1 in which the non-volatile weight ratio of the First Polymer to the Second Polymer is from 30:1 to 1:3.

3. A composition according to claim 1 in which R is $C_{1-6}$alkoxy, $C_{2-4}$alkoxy- $C_{2-4}$alkoxy, $C_{2-4}$alkanoyl, enolate or oxime.

4. A composition according to claim 1 in which the First Polymer is an addition polymer.

5. A composition According to claim 1 in which the First Polymer is held in stable dispersion by the presence of a stabiliser having an anchor component which is covalently bonded to the First Polymer.

6. A composition according to claim 4 in which the $T_g$ of the First Polymer is from $-10°$ to $50°$ C.

7. A composition according to claim 1 in which the Second Polymer is soluble in water.

8. A composition according to claim 1 in which the acid groups on the Second Polymer are carboxylic acid groups.

9. A process for making a curable composition according to claim 1 which comprises mixing a Second Polymer as defined in claim 1 with an aqueous dispersion of a First Polymer as defined in claim 1.

* * * * *